R. J. EMORY.
INTERMITTENT FEED MECHANISM.
APPLICATION FILED FEB. 25, 1914.

1,245,693.

Patented Nov. 6, 1917.

Witnesses:
S. A. Thornton.
D. F. Dames

Inventor
Robert J. Emory.
By his Attorneys
Messner Austin

UNITED STATES PATENT OFFICE.

ROBERT J. EMORY, OF NEWARK, NEW JERSEY, ASSIGNOR TO BAIRD MOTION PICTURE CO., A CORPORATION OF NEW JERSEY.

INTERMITTENT FEED MECHANISM.

1,245,693.  Specification of Letters Patent.  Patented Nov. 6, 1917.

Application filed February 25, 1914. Serial No. 821,019.

*To all whom it may concern:*

Be it known that I, ROBERT J. EMORY, a citizen of the United States, residing in Newark, in the county of Essex and State of New Jersey, have invented certain new and useful Improvements in Intermittent Feed Mechanism, of which the following is a specification.

My invention relates particularly to means for adjusting the intermittent feed mechanism of a kinetoscope or similar device for displaying moving pictures and the invention consists in providing means for quickly and accurately adjusting the parts of the Geneva stop and the intermittent feed shaft.

The invention further consists in providing means whereby the intermittent mechanism may be easily and permanently secured in its adjusted position, and in the various other new and novel features of construction and combinations of parts hereinafter set forth and claimed.

Figure 1:
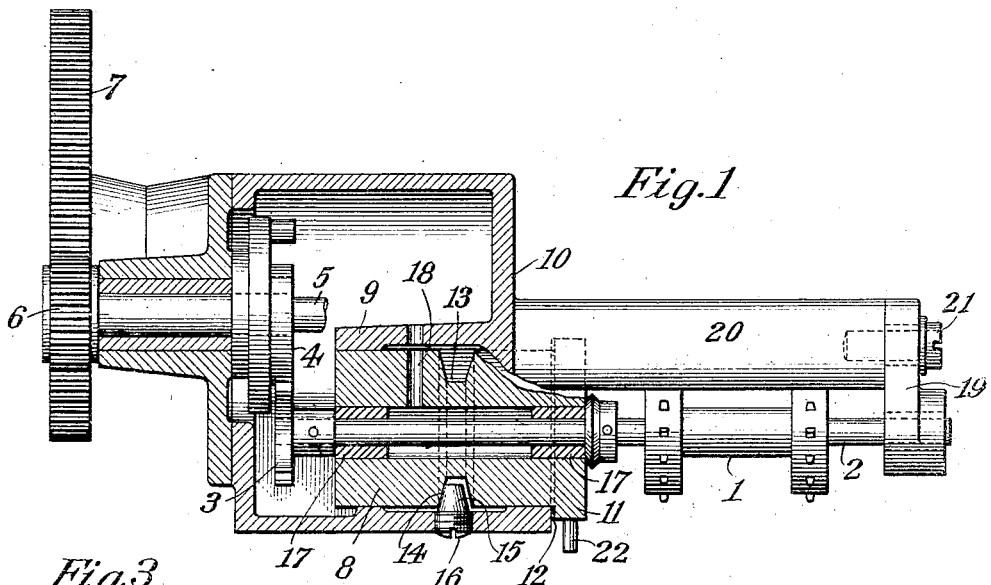
Figure 1 represents a front elevation partly in section of my improved adjusted mechanism and portion of the feeding mechanism.
Figure 3:
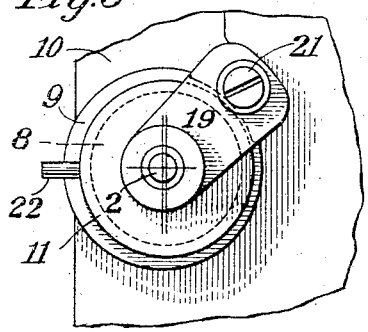
Fig. 3 is an end view showing the means for securing the sprocket wheel in adjusted position.
Figure 2:
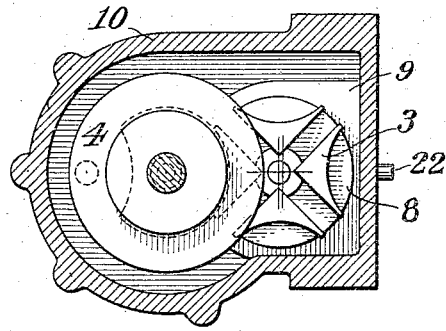
Fig. 2 is an end view showing the pin and the star forming part of the Geneva movement for intermittently actuating the sprocket.
Figure 4:
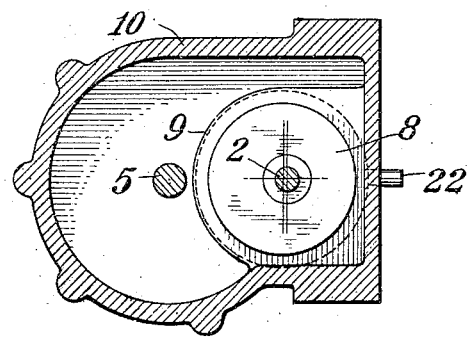
Fig. 4 is an end view partly in section showing the eccentric bushing or adjusting member.

In the particular mechanism illustrated in the accompanying drawings, the sprocket 1 is mounted upon a shaft 2 and is driven by the star-wheel 3 which is actuated by the pin-wheel 4 in the usual manner. The pin-wheel is mounted upon a shaft 5 having a driven gear 6 thereon which meshes with any suitable driving gear 7.

The sprocket shaft adjacent the star-wheel is eccentrically mounted in a sleeve or bushing 8 rotatable in suitable bearings 9 provided in the casing 10. The outer end of the sleeve 8 is enlarged to form a plate 11 disposed between which and the end of the bearing 9 is a gasket 12 to form an oil tight joint about the shaft 2 within the casing 10. The sleeve is provided with a peripheral groove 13 which is accurately cut with tapering sides 14 to engage with the tapered end 15 of an adjusting member or screw 16. This tapered end engages the side of the groove opposite the end having the plate 11 in order to hold the same firmly against the gasket. Preferably the shaft is provided with spaced bushings 17 forming a pocket permitting lubrication through a suitable duct 18 formed in the sleeve.

The free end of the shaft is mounted in an out-board bearing provided in an arm 19 supported on an extension 20 from the frame and is adjustably secured in suitable relation thereto, and in engagement with the broad bearing afforded by the end of the extension, by any suitable means as the screw 21.

In order to set the feed sprocket so that the parts of the intermittent movement will register accurately with each other, the arm 19 is first released so that it will freely adjust itself to any desired position of the shaft. The centering screw 16 is then released and the sleeve 8 is rotated in its socket by any suitable means as a pin 22 until proper adjustment has been made. After being adjusted the sleeve is locked in place by the centering screw which not only holds it against rotation, but which automatically centers the sleeve so as to bring the collar into tight engagement with the frame and sprocket wheel exactly in line with the normal path of the film. The arm 19 is then secured in the position which it has been caused to assume by the movement of the shaft during adjustment of the sprocket wheel.

By means of this construction the adjustment of the outer bearing is practically automatic since it is swung by movement of the shaft into proper position.

The extension 20 permits an outboard bearing which forms a rigid and accurate support for the outer end of the shaft, but does not interfere with the threading of the film or with access to other parts of the mechanism. Preferably this extension is elliptical in section so as to provide a relatively wide bearing face for the arm 19. The centering of the bushing is also practically automatic and consequently adjustment can be effected with certainty and a minimum loss of time. It will be obvious of course that many changes in the details of the mechanism herein shown may be made by those skilled in the art for example, as providing other means for securing the outer bearing of the sprocket shaft in place, and that various other changes may be made without departing from the invention, provided the means set forth in the following claims be employed.

Having thus described my invention, what I claim as new and desire to protect by United States Letters Patent is:

1. In a motion picture machine, a shaft, means for rotating said shaft, a bearing for said shaft comprising an adjustable bushing having a peripheral groove having tapered sides and relatively stationary means adapted to engage one of the sides of said groove to hold the bushing in its adjusted position.

2. The combination with a shaft, and means for adjusting the position of said shaft, said means including a bushing having an axis of rotation and provided with a bearing for said shaft, said bearing positioned offset from said axis of rotation and adjusting means for shifting said bearing longitudinally of its axis of rotation and into its adjusted position.

3. In a motion picture machine, a shaft, a swinging bearing for one end of said shaft and a rotatable bearing for the other end of said shaft, said rotatable bearing comprising a bushing having the shaft mounted eccentrically therein, means for locking said bushing in its adjusted position and means for rotating said shaft.

4. In a motion picture machine, a shaft, of a bearing for one end of said shaft adapted to have a swinging movement and a rotatable bearing for the other end of said shaft comprising a bushing having a peripheral groove having converging sides, a shifting member provided with a conical head engaging in said groove and means for rotating the shaft.

5. In a kinetoscope, a casing having a bearing, a sleeve mounted in said bearing, a shaft journaled in said sleeve, said shaft designed to constitute the driving shaft of one element of a Geneva stop, a star wheel constituting said Geneva stop member and having a diameter less than the diameter of the sleeve whereby said shaft, sleeve and member may be removed as a unit from said bearing and casing.

6. In a kinetoscope, a shaft, a support therefore, a journal for one end movably engaging said support, and a sleeve mounted in said support for rotation about a fixed axis, said sleeve supporting the other end of the shaft eccentrically of said axis and an element of a Geneva stop carried by the eccentrically mounted end of the shaft and a coacting element of the Geneva stop mounted in operative relation to said first named element.

7. In a kinetoscope, a bearing, a sleeve rotatably mounted in said bearing, said sleeve having a peripheral groove and a plate at one end, a gasket disposed between the said plate and bearing, a screw engaging in said groove for moving said plate into oil tight engagement with said bearing, said sleeve and bearings being provided with means for lubricating the portion of the shaft within said sleeve.

This specification signed and witnessed this 14th day of February, A. D. 1914.

ROBERT J. EMORY.

Signed in the presence of—
 JOHN W. MEMMOTT,
 T. DE C. RUTH.

Copies of this patent may be obtained for five cents each, by addressing the "Commissioner of Patents, Washington, D. C."